AMPLIFIER COMPRISING TIME DEPENDENT REACTORS

Filed Sept. 23, 1960 5 Sheets-Sheet 1

INVENTORS
Hidetoshi Takahashi
Eiichi Goto
Shintaro Oshima by Wenderoth, Lind & Ponack
Attorneys INVENTORS
Hidetoshi Takahashi
Eiichi Goto
Shintaro Oshima by Wenderoth, Lind and Ponack

ATTORNEYS

AMPLIFIER COMPRISING TIME DEPENDENT REACTORS

Filed Sept. 23, 1960 5 Sheets-Sheet 3

INVENTORS

Hidetoshi Takahashi
Eiichi Goto
Shintaro Oshima by Wenderoth, Lind & Ponack

ATTORNEYS

Aug. 20, 1963 HIDETOSHI TAKAHASHI ETAL 3,101,450

AMPLIFIER COMPRISING TIME DEPENDENT REACTORS

Filed Sept. 23, 1960 5 Sheets-Sheet 4

INVENTORS

Hidetoshi Takahashi
Eiichi Goto
Shintaro Oshima by Wenderoth, Lind & Ponack

ATTORNEYS

INVENTORS
Hidetoshi Takahashi
Eiichi Goto
Shintaro Oshima by Wenderoth, Lind and Ponack
ATTORNEYS United States Patent Office 3,101,450

Patented Aug. 20, 1963

3,101,450

AMPLIFIER COMPRISING TIME DEPENDENT REACTORS

Hidetoshi Takahashi, Eiichi Goto, and Shintaro Oshima, all of Tokyo, Japan, assignors to Kokusai Denshin Denwa Co., Ltd., Tokyo, Japan, a company of Japan Filed Sept. 23, 1960, Ser. No. 58,010
Claims priority, application Japan Mar. 30, 1955
11 Claims. (Cl. 330—7)

This invention relates to an amplifier, and more particularly to a regenerative or superregenerative amplifier composed of resonant circuits including reactance elements the reactantce of which varies with time.

Various types of amplifiers have heretofore been used, among which are amplifiers in which vacuum tubes or transistors are used, or magnetic amplifiers and dielectric amplifiers. Among such amplifiers, magnetic amplifiers have a high reliability and a long life. However, in magnetic amplifiers, rectifiers must be used. These rectifiers are far more reliable than vacuum tubes or transistors, but are inferior to magnetic cores with respect to reliability. For this reason, the reliability, the durability under conditions of use at high temperatures, the ability to carry an overload, and the life of the magnetic amplifiers as a whole are necessarily restricted by the use of rectifiers.

However, in spite of these drawbacks, rectifiers cannot be dispensed with in the hitherto used magnetic amplifiers, because it is necessary in such magnetic amplifiers that the A.C. carrier is controlled and amplified by a slowly varying input, and rectifiers are needed for making the frequency of the output the same as that of the input.

An object of the present invention is to provide an amplifier in which a non-linear reactance of magnetic cores or of non-linear capacitors is utilized, thereby eliminating the necessity for the use of rectifiers, and which amplifier operates on an input signal having a frequency substantially the same as that of the amplified output, whereby an amplifier having a high stability, an extremely long life and ability to operate under conditions of high temperatures is obtained.

Another object of the present invention is to provide an amplifier in which the non-linear reactance of magnetic cores or that of non-linear capacitors is utilized to effect stable amplification at a high gain level, which allows a mulststage amplification by direct cascading without the use of rectifiers.

These objects are accomplished by utilizing the phenomenon of parametric oscillation, i.e., a spontaneous generation of oscillations in a resonance circuit by means of periodic variation of the reactance in the resonance circuit, and by applying the principle of regenerative and superregenerative amplification.

The accompanying drawings illustrate the principle on which the amplifier circuit of the present invention operates, and further show preferred practical embodiments of the invention. In the figures.

Figure 5:
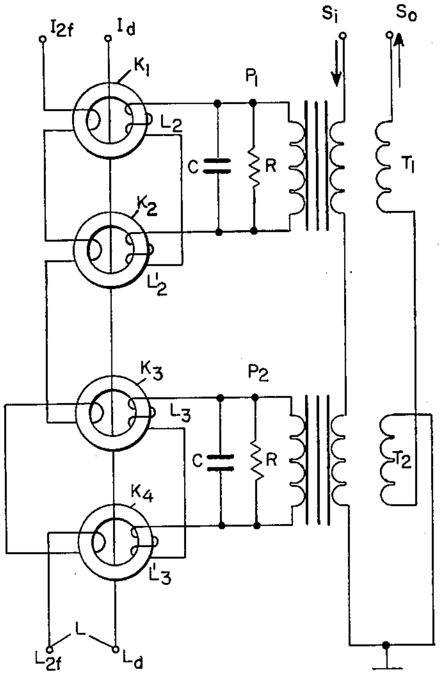
Figure 6:
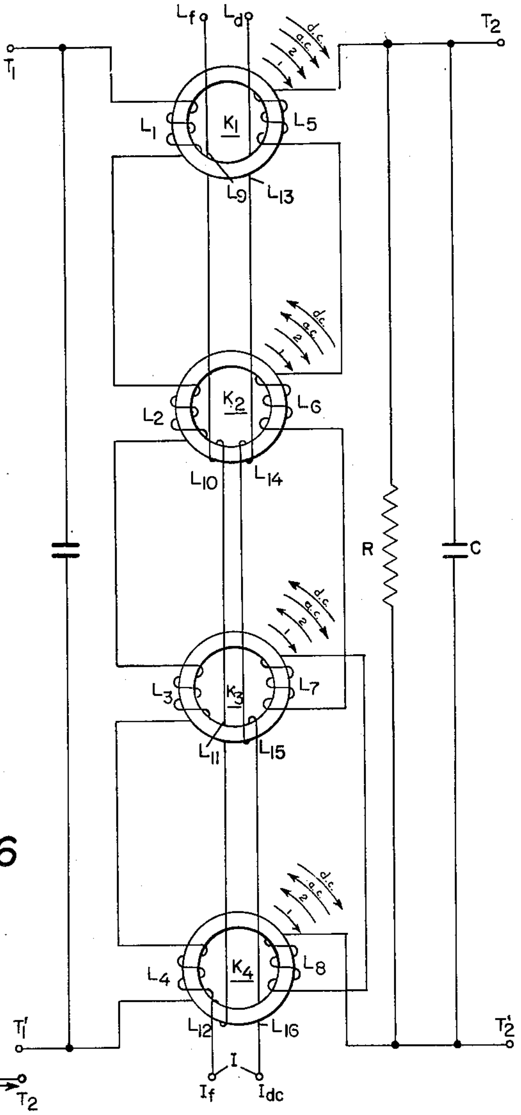
Figure 7:
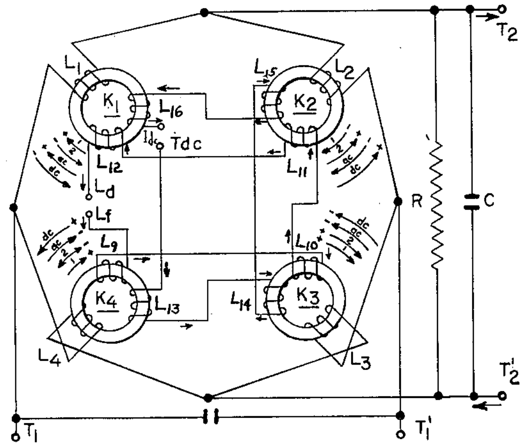
Figure 8:
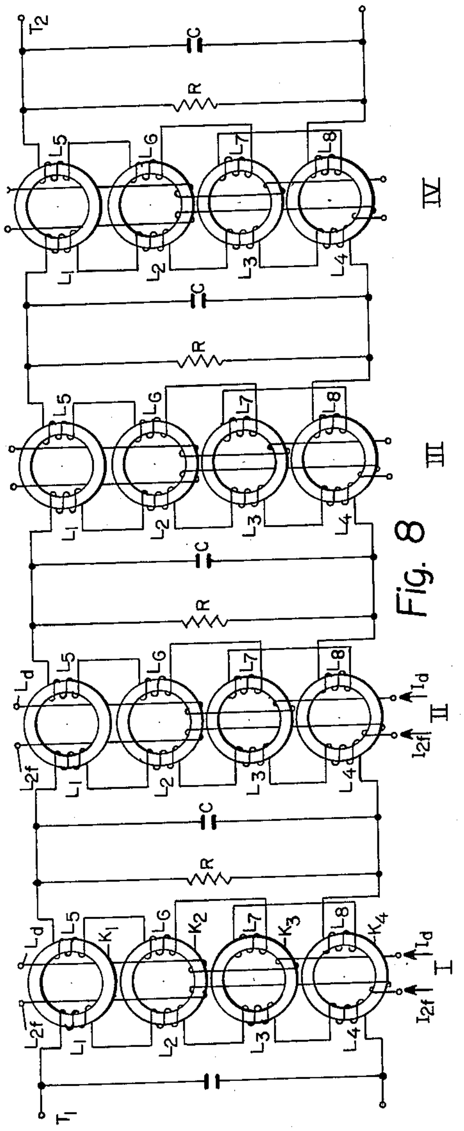
Figure 9:
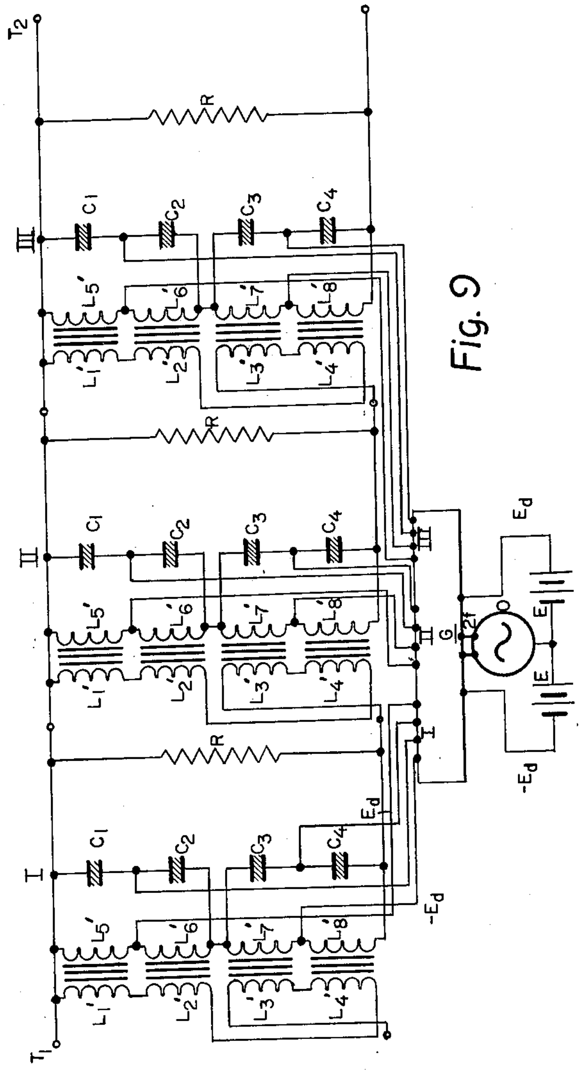
Figure 10:
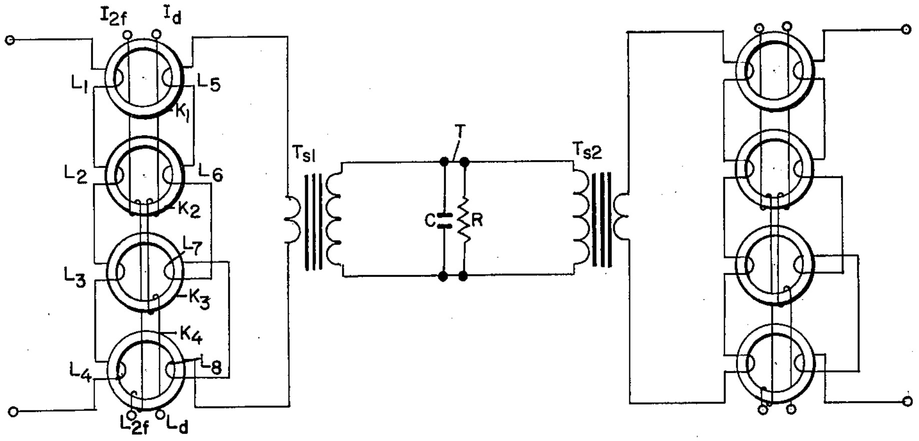
Figure 11:
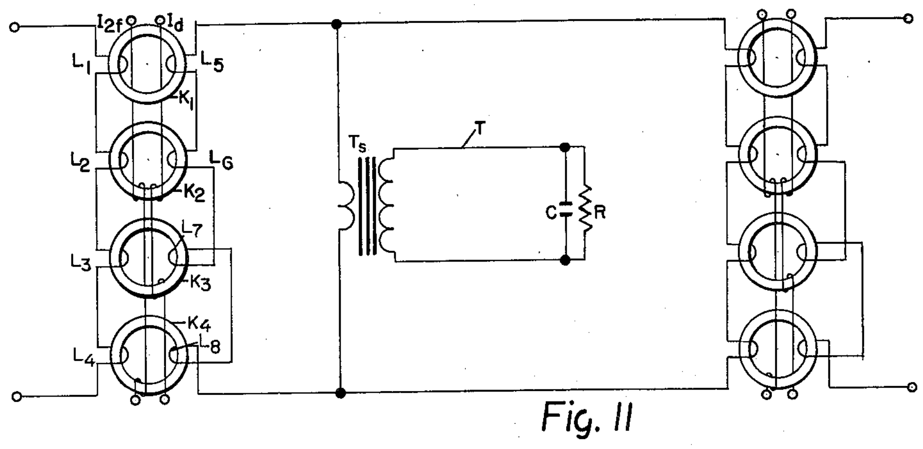
Figure 12:
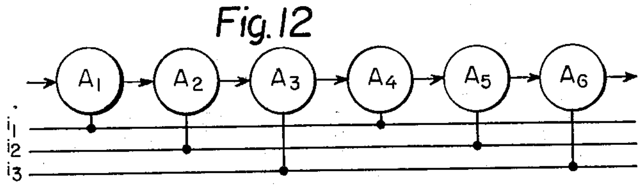

FIGS. 4A, 4B, 4C, and 4D are the wave form diagrams showing how the parametric oscillations are used to produce amplification of a signal with the amplifier of the present invention;

FIG. 5 is a circuit diagram of one amplifier circuit according to the present invention;

FIG. 6 is a circuit diagram of a modified amplifier similar to that of FIG. 5 according to the present invention;

FIG. 7 is a circuit diagram of an amplifier circuit similar to that of FIG. 6 and arranged in a closed circuit;

FIG. 8 is a circuit diagram of an amplifier circuit according to the invention in which a plurality of circuits according to FIG. 6 have been coupled in cascade;

FIG. 9 is a circuit diagram of an amplifier circuit according to the invention in which a plurality of individual amplifier circuits are coupled in cascade and are excited from a common source of exciting current;

FIG. 10 is a circuit diagram of an amplifier circuit according to the invention which is similar to the circuit diagram of FIG. 8 and having successive individual circuits coupled in a different manner than in FIG. 8;

FIG. 11 is a circuit diagram of an amplifier circuit according to the invention which is similar to the circuit diagram of FIG. 8 and having successive individual circuits coupled in a different manner than in FIG. 8; and FIG. 12 is a diagrammatic showing of the manner of exciting pluralities of amplifier circuits with a series of three exciting currents.

Figure 1A:
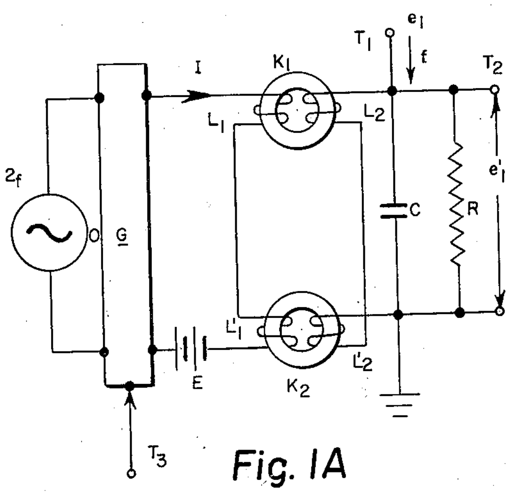
FIGS. 1A and 1B are simple circuit diagrams illustrating basic circuit elements of the present invention.
Figure 1B:
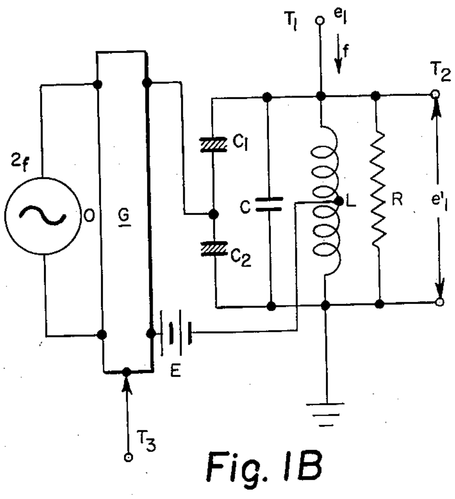

Referring to the drawings, FIG. 1A shows an oscillator circuit in which a ferromagnetic substance is used as the magnetic core of a coil to act as a reactance which varies with time, and FIG. 1B shows the case where a ferroelectric substance is used as a capacitor for acting in the sawe way. In FIG. 1A, $K_1$ and $K_2$ are a set of nonlinear magnetic cores made of a ferromagnetic substance such as ferrite; $L_2$, $L_2'$ are coils connected to a capacitor C to form a resonant circuit. $L_1$ and $L_1'$ are coils wound on cores $K_1$ and $K_2$ for exciting the resonant circuit. In FIG. 1B, $C_1$ and $C_2$ are a set of capacitors of a ferroelectric substance such as barium titanate, the said capacitors being connected with the coil L to form a resonant circuit. R is a damping resistance, E is a D.C. bias source and O is an alternating current source connected in the circuit with exciting coils $L_1$ and $L_1'$. G is a gate circuit in the exciting circuit. $T_1$ and $T_2$ are the signal input terminal and the signal output terminal respectively, and $T_3$ is the terminal in the gate circuit to which a signal is supplied for interrupting the excitation of coils $L_1$ and $L_1'$.

There shall now be explained briefly the manner in which parametric oscillations are produced with reference to the circuit of FIG. 1A. The explanation is also applicable to the circuit of FIG. 1B, in which a ferroelectric substance is used, the only difference being that in the circuit of FIG. 1B a D.C. bias voltage and an alternating exciting voltage are used, instead of the D.C. bias current and the exciting current which are used in the circuit of FIG. 1A.

Figures 2A, 2B, 2C:
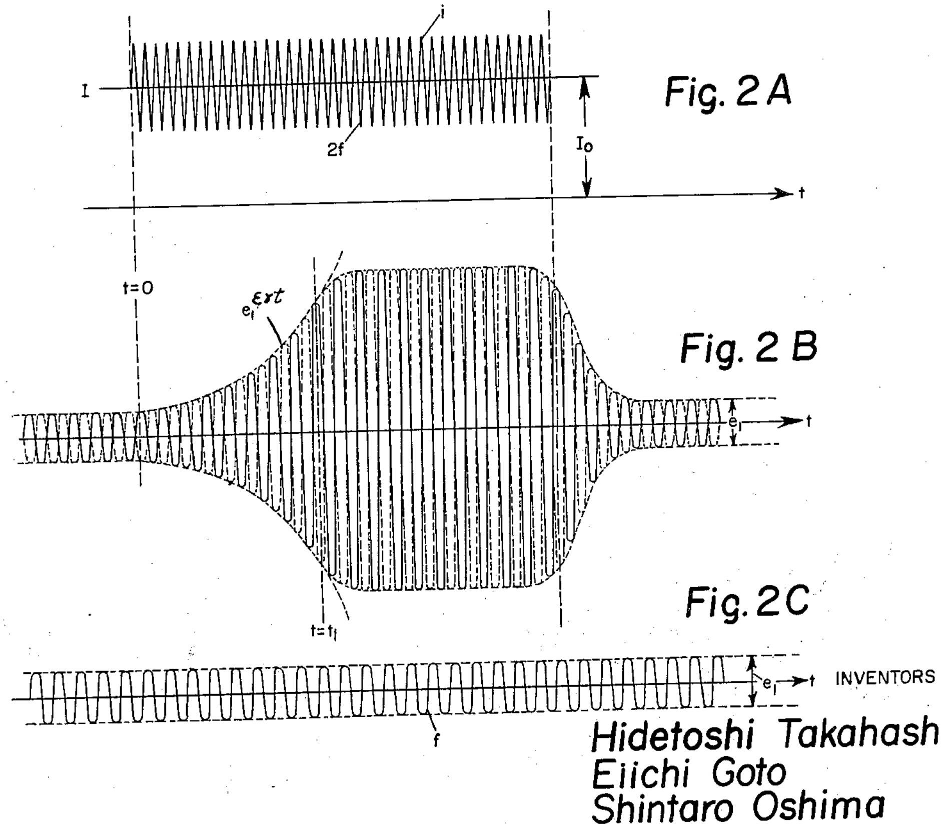
FIGS. 2A, 2B and 2C are the wave form diagrams showing the parametric oscillations obtained from the circuits of FIGS. 1A and 1B.
Figures 3A, 3B:
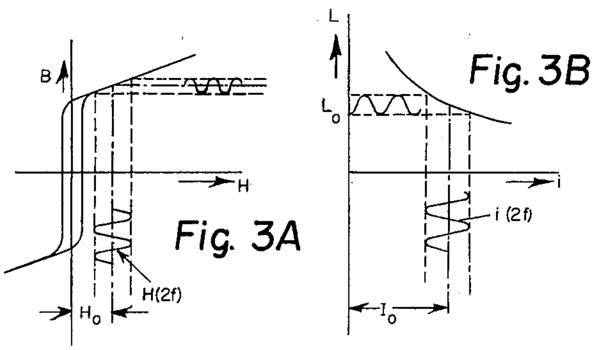

Let it be assumed that the gate circuit G is opened, and the exciting current I (FIG. 2A), which is the resultant of the high frequency current $i$, having frequency $2f$ and transmitted from the source O and the D.C. bias current $I_0$, is passed through in the exciting coils $L_1$ and $L_1'$. Then, the magnetic field H (FIG. 3A) is generated in the cores $K_1$ and $K_2$, by the high frequency current $i$ and the D.C. current $I_0$. In FIG. 3A, the magnetic field caused by $i$ is shown as $H(2f)$ and the magnetic field caued by $I_0$ as $H_0$, and the magnetic flux density B is varied as in FIG. 3A, due to the non-linear property of the cores, and therefore, the inductance of the coils $L_2$ and $L_2'$ is varied as in FIG. 3B, where L is the inductance of coils $L_2$ and $L_2'$ of FIG. 1A. When a small initial oscillation current $i_{f0}$ having frequency $f$ is present in the coils $L_2$ and $L_2'$ the inductance of which varies at the frequency $2f$ as above, e.m.f.'s having frequencies, $2f+f$ and $2f-f$, are generated in the coils $L_2$ and $L_2'$, as in the case of ordinary modulators. The e.m.f. having the frequency $2f-f$ is the e.m.f. having a frequency which is the same as that of the small initial oscillation current $i_{f0}$. Such e.m.f. tends to increase the $i_{f0}$ initially present. By repeating such feed back process, the resonant current $i_f$ increases according to the equation $$i_f = i_{f0}{}^{\epsilon\gamma t}$$

where $\gamma$ is the rate of building up of the oscillation. The greater is the modulation, the larger is the variation of inductance, and the higher the Q of the circuit, the larger the value of $\gamma$. Therefore by choosing a large value of $\gamma$, $i_f$ can be rapidly increased. However, when $i_f$ increases beyond a certain value, the rate of building up of $i_f$ is slowed down by the saturation and hysteresis of the core until a definite amplitude is attained. The above phenomenon is called parametrically excited oscillation. This oscillation is sustained as long as the exciting current I flows. Such oscillation is shown in voltage wave form in FIG. 2B. The input signal as shown in FIG. 2C, having the frequency $f$ and the amplitude $e_1$, which corresponds to the initial oscillation, is applied to the input terminal $T_1$, and the exciting current I is passed through the exciting circuit by opening the gate circuit G. Then, $e_1$ is amplified in the form of $e_1{}^{\epsilon\gamma t}$ as shown by dot-and-dash lines in FIG. 2B, and is taken out at the output terminal $T_2$. When $e_1$ is amplified to a certain value, a definite amplitude is attained, as shown by the level horizontal line defined by the peaks of the wave forms, due to the saturation phenomenon. When gate circuit G is closed and the supply of the exciting current is stopped, the oscillation stops. Therefore, by interrupting the gate circuit in order to supply or cease to supply the exciting current I, the building up, namely the amplification of $i_f$ can be performed repeatedly.

Figures 3C, 4A, 4B, 4C, 4D:
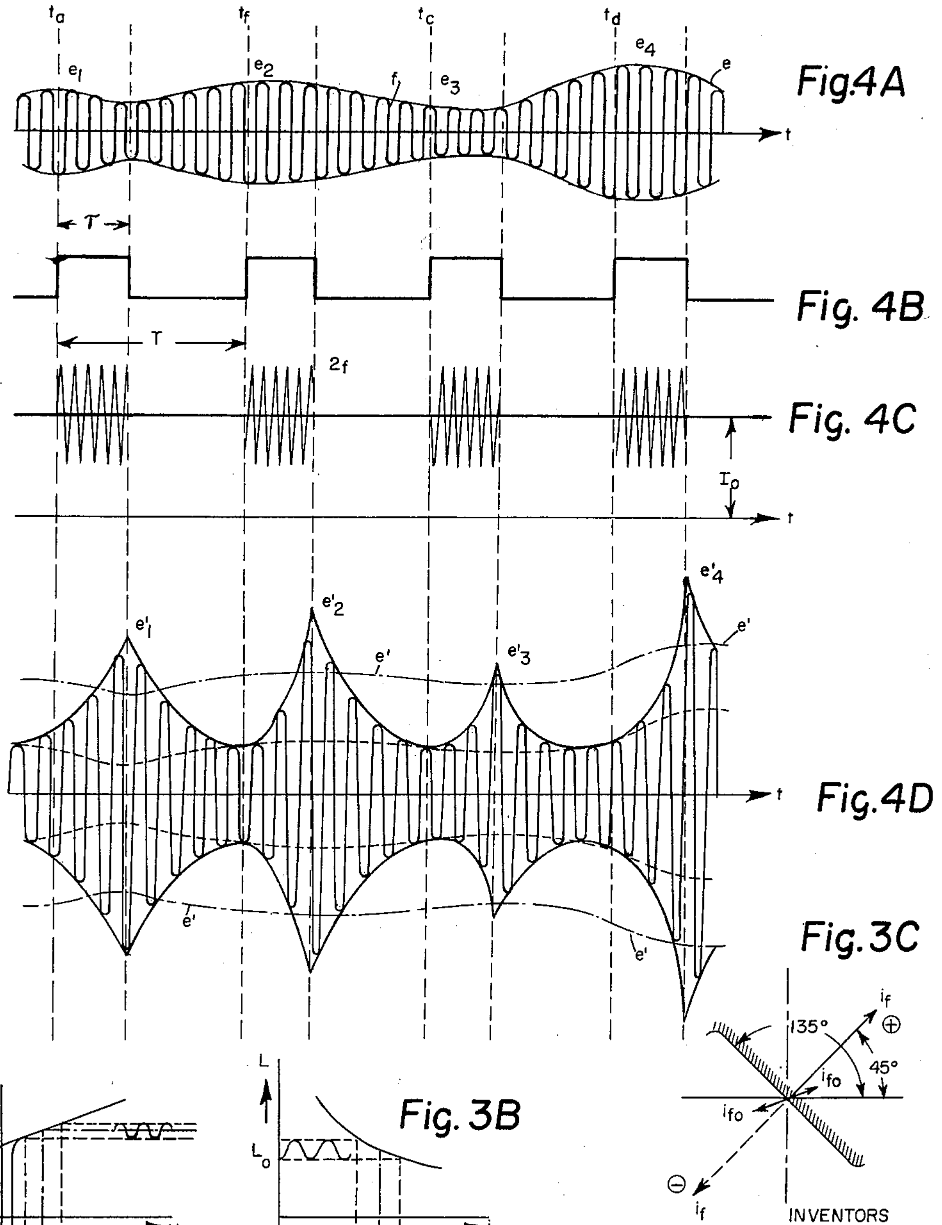
FIGS. 3A, 3B and 3C are diagrams showing the characteristics of the circuits of FIGS. 1A and 1B.

The above oscillator (hereinafter called a "parametrically excited oscillator") oscillates at either one of the two phases, different from each other by $\pi$, having a definite relation with the current or voltage of frequency $2f$ (hereinafter called the "exciting wave"), and such relation is shown by the voltage wave forms in solid and dotted lines in FIG. 2B. The parametrically excited oscillator oscillates at either one of the above phases, different by $\pi$, depending upon whether the phase of the initial oscillation or input signal having a frequency $f$ is within certain limits, or outside of such limits. FIG. 3C shows such limits and the phase of the oscillation, taking the phase of the exciting wave as a reference. When the phase of the initial oscillation $e_1$ is within the limits shown by the shading, the oscillation will have the phase ⊕ shown by solid line (about $-45°$), and when the phase of $e_1$ is outside of the limits shown by shading, the oscillation will have the phase ⊖ shown by dotted line (about $-135°$). In this way, the parametrically excited oscillator has the function of normalizing the phase of the input signal, depending upon whether the phase thereof is within or outside the limits between about 135° and $-45°$.

Now assuming that, in FIGS. 2a–2c, the exciting wave I is applied at a time $t=0$, and that the amplification characteristic deviates from the curve defined by $e_1{}^{\epsilon\gamma t}$, due to saturation, at the time $t=t_1$, the voltage of the resonant circuit in relation to time $t$, which satisfies $0<t<t_1$, is, according to the theory of parametric oscillation, as follows:

$$e_1(t) = e_{1c}{}^{\epsilon\gamma t} \cos(2\pi ft+\theta) + e_{1s}{}^{\epsilon\gamma t} \sin(2\pi ft+\theta) \quad (1)$$

where $\gamma$ and $\gamma'$ are certain positive constants, and $e_{1c}$ and $e_{1s}$ are the cosine component and sine component, respectively, of $e_1$. When the exciting wave I is supplied or is cut off, in order to make the time $t$, at which the exciting wave I is applied, satisfy the condition $0<t<t_1$, the voltage $e(t)$, shown in the Formula 1, is taken out at the output terminal $T_2$ at the time $t$ when I is applied. Therefore, assuming that an input signal having frequency $f$, the amplitude of which is modulated as in FIG. 4A, has been applied to the signal input terminal $T_1$ in FIG. 1, there is applied to the terminal $T_3$, at every T second interval, a rectangular wave for the time interval $\tau$ as shown in FIG. 4B for controlling the opening and closing of the gate circuit G, and thereby an excitation current having frequency $2f$ is supplied to the exciting coils $L_1$ and $L_1'$, during each period $\tau$ commencing at intervals T, as shown in FIG. 4C. Then, by selecting the value of $\tau$ to satisfy the above condition, namely, $0<\tau<t_1$, the cosine components of the voltages $e_1$, $e_2$, $e_3$ . . . of the input signal at each instant of time, $t_a$, $t_b$, $t_c$ . . . at the start of each excitation period $\tau$ are amplified $\epsilon^{\gamma\tau}$ times, during the period of $\tau$ seconds, and a voltage having a wave form, as shown in FIG. 4D is obtained at the output terminal. Thus, by impressing the exciting current of frequency $2f$ for a period of $\tau$ seconds at the beginning of a time period T, the cosine component each of the instantaneous values, $e_1$, $e_2$, $e_3$ . . . of the input signal having frequency $f$ at instant of time $t_a$, $t_b$, $t_c$ . . . is linearly amplified $\epsilon^{\gamma\tau}$ times, and $e_1' = e_{1c}{}^{\epsilon\gamma\tau}$, $e_2' = \epsilon^{\gamma\tau}$, $e_3' = e_{3c}\tau$ . . . are taken out at the terminal $T_2$, at times delayed by $\tau$ seconds from $t_a$, $t_b$, $t_c$ . . . The operation of the above described amplifier can best be described as superregenerative amplification. To apply the exciting wave intermittently corresponds to the quenching of the superregenerative amplifier. Then, for a frequency band width of the envelope of the input signal (an amplitude modulated wave having frequency $f$) which is limited to $w$ c./s. the period T is selected so that $$T < \frac{1}{2W}$$

and the output wave taken out at the output terminal $T_2$ in FIG. 1 is passed through a band pass filter having a pass band from $f-w$ c./s. to $f+w$ c./s. and is demodulated, or the output is demodulated and the demodulated wave is passed through a low pass filter having the pass band $w$ c./s. In this way, the voltage $e$ (shown by broken lines in FIG. 4A) can be amplified $K\epsilon^{\gamma\tau}$ times (shown by $e'$ in dot-and-dash lines of FIG. 4D), where K is a coefficient determined by the period T, the Q of the resonant circuit and the characteristics of the demodulating circuit.

The above description is of the case in which the exciting voltage is applied to the non-linear reactances and then interrupted as a means for exciting and stopping the parametric oscillations. However, a similar result can be obtained by using a frequency-modulated exciting current, and by making the frequency of the exciting wave deviate periodically from $2f$, or by varying the D.C. bias current or voltage, instead of using the above-mentioned method of supplying and cutting off.

The above description relates to a single stage amplifier, and according to the experiments made, an amplification of about 70 db may be obtained in a single stage. Contrary to what is the case with an ordinary magnetic amplifier, the new amplifier circuit can be connected in cascade without demodulating or rectifying the output. When the exciting circuits are successively excited in the order of the stages, and the cascade connection is made through an impedance, the input signal applied to $T_1$ and amplified in the first stage is again amplified in each succeeding stage, and the amplified output can be taken out from the last stage.

However, when such a cascade connection is made simply by coupling through impedances, a back-coupling (which means that the voltage of one stage goes back to the preceding stages) can occur, due to the fact that the input and output circuits of the parametrically excited circuit are connected to the same resonant circuit. More particularly, when such a circuit is used as an amplifier, a self-oscillation may occur and the operation may become unstable, due to higher voltage in the succeeding stages being fed back to the preceding stages, unless the coupling intensity is weak or the back-coupling voltage is neutralized. Also, since only the cosine component of the input wave is amplified in the parametrically excited circuit, a faithful amplification of the input signal formed by the modulated wave of the carrier wave having frequency $f$ can only be made when it is synchronized with the exciting wave having frequency $2f$. In the case of a carrier wave not synchronized, an undesirable beat occurs in the output signal.

FIG. 5 shows a circuit according to the invention in which the above enumerated defects are eliminated. It is a circuit composed of the two circuits $P_1$ and $P_2$ which are basically the same as the circuit of FIG. 1A. The exciting coil $L_1$ is divided into bias winding $L_d$ and the exciting coil $L_{2f}$ having a signal thereof of frequency $2f$. Exciting coil $L_{2f}$ is wound around the cores in one direction in circuit $P_1$ and in the opposite direction in circuit $P_2$. A gate circuit for interrupting the electric power (not shown) is provided for at least one of the power supply windings as in the circuit of 1A. The input and output circuits $S_i$ and $S_o$ are coupled by means of transformers $T_1$ and $T_2$, respectively to $P_1$ and $P_2$, as shown in the drawing. Circuit $P_1$ is similar to the circuit shown in FIG. 1A, and it amplifies only the cosine component. The polarity of the exciting coil for circuit $P_2$ is the reverse of that of circuit $P_1$, and therefore, the variation of reactance in circuit $P_2$ is always in the reverse direction compared to that in circuit $P_1$, and thus circuit $P_2$ amplifies only the sine component. By connecting the two amplifiers in series, the sine component can be amplified on the one hand, and the cosine component on the other hand. By applying the input $e_1$ at the terminal $S_i$ in FIG. 5, $e_1$ is divided into the cosine and sine components. Namely:

$$e_1=e_{1c}+je_{1s} \quad (2)$$

As is clear from the foregoing description, $e_{1c}$ and $e_{1s}$ are uniformly multiplied by a factor $\epsilon^{\gamma\tau}$ in circuits $P_1$ and at $P_2$ respectively.

Therefore, an output voltage $e_1'$:

$$e_1'=e_{1c}{}^{\epsilon\gamma\tau}+je_{1s}{}^{\epsilon\gamma\tau} \quad (3)$$

appears at the terminal $Si$, and an amplified output can be obtained without any beat. On the other hand, a voltage $e_1''$:

$$e_1''=\epsilon^{\gamma\tau}(e_{1c}+je_{1s}) \quad (4)$$

appears at the terminal $S_o$ of another winding which is connected differentially. This voltage $e_1''$ has a phase different from that of the input wave $e_1$, but the envelope thereof is correctly amplified. Further, the terminals $S_i$ and $S_o$ stand in the relation of uncoupled terminals of a hybrid circuit (differential transformer circuit) during the period of non-excitation, as shown in the drawing, and therefore, no coupling occurs between the input and output. When such a circuit is connected in cascade, no back-coupling occurs.

FIG. 6 shows one variation of a circuit similar to that of FIG. 5 which forms a single stage of an amplifier, in which non-linear magnetic cores are also used as transformer cores and the position of the capacitor is changed in accordance with the theory of hybrid circuits.

The circuit comprises two resonant circuits, the first having four transformer windings $L_1$, $L_2$, $L_3$ and $L_4$ therein and tuned to frequency $f$, and the second having four transformer windings $L_5$, $L_6$, $L_7$ and $L_8$ therein and tuned to frequency $F-f$. There are four non-linear inductances $K_1$, $K_2$, $K_3$ and $K_4$ in the shape of cores. Also provided are an A.C. power supply circuit $L_F$ for supplying an A.C. signal of frequency F, and a D.C. power supply line $L_d$, each of which has four transformer windings therein, the A.C. power supply line having windings $L_9$, $L_{10}$, $L_{11}$ and $L_{12}$ therein and the D.C. power supply line having windings $L_{13}$, $L_{14}$, $L_{15}$ and $L_{16}$ therein. A gate circuit for interrupting the electric power (not shown) is provided for at least one of the power supply windings. The first and second resonant circuits and the two power circuits are coupled to said inductances through said transformer windings.

All of the windings $L_1$, $L_2$, $L_3$ and $L_4$ in the first resonant circuit are wound in one direction, and two of the windings $L_5$ and $L_6$ in the second resonant circuit are wound in said one direction and two, $L_7$ and $L_8$ are wound in the other direction. Two of the windings in the A.C. power supply $L_9$ and $L_{11}$ are wound in said one direction with winding $L_9$ being on a core $K_1$ with a winding $L_5$ from said second resonant circuit which is wound in said one direction and winding $L_{11}$ being on a core $K_3$ with a winding $L_7$ from said second circuit which is wound in the other direction. The other two windings $L_{10}$ and $L_{12}$ of the A.C. power supply line are wound in said other direction and are on the cores $K_2$ and $K_4$ respectively. The D.C. power supply line has four windings $L_{13}$, $L_{14}$, $L_{15}$ and $L_{16}$, one on each core. Two of the windings $L_{13}$ and $L_{16}$ are wound in said one direction with winding $L_{13}$ being on a core $K_1$ with a winding $L_5$ from the second resonant circuit which is wound in the said one direction and with the winding $L_9$ from the A.C. power supply line which is wound in the said one direction, and the other winding $L_{16}$ being on core $K_4$ with winding $L_8$ from the said second resonant circuit which is wound in the said other direction and with winding $L_{12}$ from the A.C. power supply line which is wound in the said other direction. The other two windings $L_{14}$ and $L_{15}$ of the D.C. power supply line are wound in said other direction, winding $L_{14}$ being on core $K_2$ and winding $L_{15}$ being on core $K_3$. One of said resonant circuits having a resonant frequency $f$ and the other has a resonant frequency $F-f$.

Thus the couplings of all of the circuits to the first non-linear core $K_1$ are all of the same polarity (polarity indicated by the arrows in FIG. 6), while the coupling of the first and second resonant circuits to the second non-linear core $K_2$ are of one polarity and the couplings of the A.C. power supply circuits and D.C. supply line to the second core $K_2$ are of the polarity opposite to said one polarity. The couplings of the first resonant circuit and the A.C. power supply circuit to the third core $K_3$ are of said one polarity while the couplings of the second resonant circuit and the D.C. line to the third core $K_3$ are of the opposite polarity. The couplings of the first resonant circuit and the D.C. line to the fourth core $K_4$ are of one polarity and the couplings of the second resonant circuit and the A.C. power supply circuit to said forth core $K_4$ are of the opposite polarity.

Thus, when an A.C. signal with a frequency F is supplied to the A.C. power supply line $L_{2f}$ and a D.C. signal is supplied to the D.C. line $L_d$ and a modulated signal with a carrier frequency $f$ is applied to said resonant circuit with a resonant frequency $f$, oscillations are generated in said resonant circuits which can be used as amplified output.

FIG. 7 shows a variation of the circuit of FIG. 6 in which the resonant circuits are in bridge form and in a closed configuration. This circuit is equivalent to the circuit of FIG. 6 according to the "theory of network transformation."

However, even with the circuits of FIGS. 6 and 7, beat is produced between the input and output frequencies, or an oscillation is produced by back-coupling, unless the characteristics of each core are completely uniform and the balanced modulator circuit is completely balanced. However, it is clear that amplification takes place in the circuits, even when the frequency of input signal varies slightly from $f$.

FIG. 8 shows a plurality of circuits according to FIG. 6 connected in cascade. Amplification is accomplished by exciting the circuits in succession as afore-mentioned. Since the above devices eliminate back-coupling, such close inter-stage coupling is possible. In this circuit, two resonant circuits of the two successive stages are directly connected and such resonant circuits have a common capacitor.

Further, the amplification can be made by tuning the resonant circuits of FIG. 8 separately to the frequencies of the input and output signals, even when the input and output frequencies are considerably different from $f$. In this case, however, assuming that the frequency of the input signal is $f_1$, the frequency of the output voltage is:

$$f_2=F-f_1$$

The amplification which takes place in this case can better be explained as follows, by considering this circuit as a balanced modulator.

When a signal having frequency $f_1$ is introduced into the input, and the frequency of the A.C. exciting current is F, the output waves of frequencies $F-f_1=f_2$ and $F+f_1$ are produced in the output, and since the output is tuned to $f_2$, a large current having frequency $f_2$ flows therein, inducing the voltage $F-f_2=f_1$ in the input, producing a positive feed back, whereby the building up occurs as afore-mentioned. The above-mentioned example can be considered as a special case in which $f_1=f_2=F/2$. When $f_1$ and $f_2$ have quite different values, the input and output signals can be separated by filters, and back coupling and beat may be eliminated in spite of an inevitable unbalance inherent to the balanced circuit. For connecting the circuits having different input and output frequencies $f_1$ and $f_2$ in cascade, the input signal frequency $f_1$ can be converted into $f_2$ by the first stage of the amplifier, and the signal with frequency $f_2$ used as input to the succeeding stage, whereby the output of said succeeding stage is again made to have the frequency $f_1$. By repeating this process, multi-stage amplification can be accomplished. When an even number of stages is used for this circuit, the frequencies of the input and output are the same; while when an odd number of stages is used, the amplifier functions as a frequency converter.

In the circuit of FIG. 8, each stage is excited with the same exciting frequency F, in order to simplify the exciting apparatus. However, the exciting frequency may differ for each stage.

In FIG. 9, ferro-electric capacitors $C_1$, $C_2$, $C_3$ and $C_4$ are used as non-linear reactance elements and are connected in such a way as to avoid back-coupling. The principle of amplification is exactly the same as in FIG. 6. This amplifier comprises a plurality of amplifier circuits each comprising two resonant circuits, one resonant circuit having four windings $L_1'$, $L_2'$, $L_3'$ and $L_4'$ in series therein, and the other resonant circuit having windings $L_5'$, $L_6'$, $L_7'$ and $L_8'$ in series therein. Each winding in each resonant circuit is paired with a winding in the other resonant circuit, windings $L_1'$ and $L_5'$ being paired, windings $L_2'$ and $L_6'$ being paired etc., and two of the windings $L_3'$ and $L_4'$ in one resonant circuit are reversed with respect to the other windings $L_1'$ and $L_2'$ in said one circuit. Linear cores are provided on which said windings are wound. Said other circuit has four non-linear capacitances $C_1$, $C_2$, $C_3$ and $C_4$, $C_1$ and $C_2$ being coupled across the two windings $L_5'$ and $L_6'$. One side of an A.C. power supply line is coupled to said other resonant circuit between the two capacitances $C_1$ and $C_2$, and the other side of the A.C. power supply line is coupled to said other resonant circuit between the other two capacitances $C_3$ and $C_4$. A first D.C. power supply line is coupled to said other resonant circuit between the two windings $L_5'$ and $L_6'$ paired with the unreversed windings $L_1'$ and $L_2'$ in said one resonant circuit, and a second D.C. power supply line is coupled to said other resonant circuit between the two windings $L_7'$ and $L_8'$ paired with the reversed windings $L_3'$ and $L_4'$ in said one resonant circuit. One of said resonant circuits has a resonant frequency $f$ and the other has a resonant frequency $F-f$. The amplifier circuits are coupled to each other with the resonant circuits of a preceding amplifier circuit being coupled to a succeeding amplifier circuit with the resonant circuit of the preceding amplifier circuit having the frequency $F-f$ being the resonant circuit of the succeeding amplifier circuit having the frequency $F-f$. An A.C. power supply means O is coupled to said A.C. power supply lines in each amplifier circuit, a source of negative D.C. bias $-Ed$ is coupled to said second D.C. power supply lines in each amplifier circuit, and a source of positive D.C. bias $+Ed$ of a value equal to the negative D.C. bias is coupled to said first D.C. power supply lines in each amplifier circuit. Control means are provided in said power supplies for controlling said power supplies for periodically interrupting the oscillation generated in said resonant circuits with the oscillations in a preceding amplifier circuit being interrupted just after the oscillations in a succeeding amplifier circuit are started. To supply a signal to be amplified, means can be coupled to the resonant circuit of the first of said amplifier circuits for applying thereto a modulated signal with a carrier frequency $f$, and means can be coupled with one of the resonant circuits in the last of said amplifier circuits for passing the oscillations generated in said one resonant circuit through a band pass filter and demodulating it.

When a ferro-magnetic substance is used, such as the magnetic cores of FIG. 6, a sufficient coupling is obtained by placing one or two turns of the winding on each ferro-magnetic core at $L_1$, $L_2$, $L_3$, $L_4$ and $L_5$, $L_6$, $L_7$, $L_8$ . . . However, in such a case, the inductance is usually very small and in order to make the resonance frequency of the resonant circuit sufficiently low, it is necessary to make the capacity of the capacitor C comparatively large. In such cases, therefore, the coupling may be modified as shown in FIG. 10, in which the primary and the secondary windings of the balanced modulators to be connected in cascade are coupled through the transformers $T_{s1}$ and $T_{s2}$ and the capacitor of the resonant circuit may be in the linking circuit. Alternatively, as shown in FIG. 11, the secondary windings of the first amplifier circuit can be connected in parallel with the primary windings of a second amplifier circuit and the primary windings of the transformer $T_s$, in order to form the resonant circuit T with the secondary windings of transformer $T_s$ and the capacitor C. By selecting a proper number of turns of windings of the transformers $T_{s1}$, $T_{s2}$ or $T_s$, the capacity of the capacitor C can be set at a proper value. Also, the wiring of the resonant circuit can be shortened, even when each of the amplifier circuits to be connected in cascade are separated. Such are the advantages obtained by the examples shown in the above figures.

In the multi-stage amplification circuit, explained above, separate exciting waves may be applied to each stage, or one interrupted exciting wave can excite a plurality of stages. However it is also possible to divide the stages in groups and to excite each group periodically in succession. For example, as shown in FIG. 12, the individual amplifier circuits $A_1$, $A_2$ . . . $A_6$ are divided in three groups, the excitation wave $i_1$ exciting $A_1$ and $A_4$, $i_2$ exciting $A_2$ and $A_5$, and $i_3$ exciting $A_3$ and $A_6$.

As is clear from the foregoing description, a high frequency A.C. current is used both as input and output in the amplifiers of the invention, and therefore, no rectifier is necessary for the inter-stage coupling, as explained above. A multi-stage amplifier having an extremely high gain, can be made by using only coils, condensers, resistances and ferro-magnetic cores or ferro-electric condensers, and therefore the life of the amplifier is much longer than the hitherto used magnetic amplifiers and dielectric amplifiers. The exciting wave used for the amplifiers of the invention corresponds to the D.C. power source of the ordinary vacuum tube amplifiers or to the carrier power source of the ordinary magnetic amplifiers and dielectric amplifiers. Further, the interruption of the exciting wave corresponds to the interruption of the D.C. plate supply voltage of a thyratron.

For ordinary magnetic amplifiers or dielectric amplifiers, reactance elements, the value of which varies, are also used. However, the frequency of such variation is considerably slower than that of the carrier wave. On the contrary, the frequency with which the reactance value is varied for the amplifiers of the present invention is higher than that of the input and output signal, and therefore, is higher than the tuning frequency of the resonant circuit used for the amplifiers of the invention.

According to the experiments made, amplifiers according to the invention can be used for a very high frequency signal. For example, when copper-zinc-ferrite is used for the cores $K_1$ and $K_2$, in FIG. 1A, signal frequencies such as $f=2$ mc. (exciting wave $F=4$ mc.) could be used, and an amplification of 70 db can be obtained in one stage. Also, where lead zirconate is used for the capacitors, $C_1$ and $C_2$, in FIG. 1B, signal frequencies as high as $f=5$ mc. (exciting wave $F=10$ mc.) can be handled.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

This application is a continuation-in-part of application Serial No. 572,696, filed March 20, 1956, now abandoned.

We claim:

1. An amplifying device comprising an input circuit, an output circuit, a first, second, third and fourth nonlinear reactances, an A.C. power supply circuit for supplying an A.C. signal of frequency F, a first resonant circuit tuned to a frequency substantially equal to $f$ and coupled to said input circuit, a second resonant circuit tuned to a frequency substantially equal to $F-f$, said output circuit being connected to at least one of said resonant circuits, a D.C. bias power supply circuit, each of said circuits having multiple transformer windings therein, said first and second resonant circuits and said A.C. power supply circuit and said D.C. bias power supply circuit being coupled with said four non-linear reactances through said transformer windings, the coupling of said circuits to said first non-linear reactance all being of one polarity, the couplings of said first and second resonant circuits to said second non-linear reactance being of said one polarity and the coupling of said A.C. power supply and said D.C. bias power supply circuits to said second non-linear reactance being of a polarity opposite to said one polarity, the coupling of said first resonant circuit and said A.C. power supply circuit to said third non-linear reactance being of said one polarity and the coupling of said second resonant circuit and said D.C. bias power supply circuit to said third non-linear reactance being of said opposite polarity, and the coupling of said first resonant circuit and said D.C. bias power supply circuit to said fourth non-linear reactance being of one polarity and the coupling of said second resonant circuit and said A.C. power supply circuit to said fourth non-linear reactance being of said opposite polarity, said four non-linear reactances having substantially the same characteristics and the resonant frequency of said resonant circuits being determined by the value of said four non-linear reactances, said first and second resonant circuits being electrically decoupled from each other and substantially no A.C. power being transmitted therebetween when an A.C. power signal is applied to the circuit, means for applying an A.C. signal of frequency F to said A.C. power supply circuit and means for applying a D.C. signal to said D.C. power supply circuit, and means for applying a modulated signal input with a carrier frequency $f$ to said first resonant circuit, whereby parametric oscillations are generated in said resonant circuits for producing an amplified output.

2. An amplifying device as claimed in claim 1, further having means in at least one of said power supply circuits for controlling the power supply circuits for periodically interrupting the oscillations generated in said resonant circuits, whereby superregenerative amplification of said modulated signal input can be obtained.

3. An amplifier circuit comprising an input circuit, an output circuit, two resonant circuits, each having four windings therein, four non-linear inductances in the shape of cores, a winding in each resonant circuit wound on each core, all of the windings in the first resonant circuit being wound in one direction, and two of the windings in the second resonant circuit being wound in said one direction and the other two being wound in the other direction, the values of said inductances determining the resonant frequency of said resonant circuits, an A.C. power supply line for supplying an A.C. signal of frequency F and a D.C. power supply line, the A.C. power supply line having four windings, one on each core, two of the windings being wound in said one direction with one of said last mentioned two windings being on a core with a winding from said second resonant circuit which is wound in said one direction and the other of said last mentioned two windings being on a core with a winding from said second circuit which is wound in the other direction, and the other two windings of the A.C. power supply line being wound in said other direction, and said D.C. power supply line having four windings, one on each core, two of the windings being wound in said one direction with one of said last mentioned two windings being on a core with a winding from the second resonant circuit which is wound in the said one direction and with a winding from the A.C. power supply line which is wound in the said one direction, and the other of said last mentioned two windings being on a core with a winding from the said second resonant circuit which is wound in the said other direction and with a winding from the A.C. power supply line which is wound in the said other direction, and the other two windings of the D.C. power supply line being wound in said other direction, one of said resonant circuits being coupled to said input circuit and the other of said resonant circuits having a resonant frequency $F-f$, said output circuit being coupled to at least one of said resonant circuits, said first and second resonant circuits being electrically decoupled from each other and substantially no A.C. power being transmitted therebetween when an A.C. power signal is applied to the circuit, means for applying an A.C. signal of frequency F to said A.C. power supply circuit, and means for applying a D.C. signal to said D.C. power supply circuit, and means for applying a modulated signal input with a carrier frequency $f$ to said first resonant circuit, whereby parametric oscillations are generated in said resonant circuits for producing an amplified output.

4. An amplifier circuit as claimed in claim 3 in which the windings in said first resonant circuit are separate from the windings in said second resonant circuit.

5. An amplifier circuit as claimed in claim 3 in which the windings in said first resonant circuit are common to the windings in said second resonant circuit, the four windings being connected in a closed series loop and said first resonant circuit being connected to said loop at points spaced by two windings and said second resonant circuit being connected to said loop at points spaced by two windings and offset around said loop from the points at which said first resonant circuit is connected by one winding.

6. An amplifier circuit comprising an input circuit, an output circuit, two resonant circuits, each having $4n$ windings therein, a plurality of $4n$ non-linear inductances in the shape of cores, where $n$ is a whole number, a winding in each resonant circuit wound on each core, all of the windings in the first resonant circuit being wound in one direction and $2n$ windings in the second resonant circuit being wound in said one direction and the other $2n$ windings being wound in the other direction, the values of said inductances determining the resonant frequency of said resonant circuits, an A.C. power supply line for supplying an A.C. signal of frequency F and a D.C. power supply line, the A.C. power supply line having $4n$ windings, one on each core, $2n$ of said windings being wound in said one direction with $n$ of said last mentioned $2n$ windings being on cores with windings from said second resonant circuit which are wound in said one direction and the other of said last mentioned $2n$ windings being on cores with windings from said second resonant circuit which are wound in said other direction, and the other $2n$ windings of the A.C. power supply line being wound in said other direction, and said D.C. power supply line having $4n$ windings, one on each core, $2n$ of said windings being wound in said one direction with $n$ of said last mentioned $2n$ windings being on cores with windings from said second resonant circuit which are wound in the said one direction and with windings from the A.C. power supply line which are wound in the said one direction, and the other of said last mentioned $2n$ windings being on cores with windings from said second resonant circuit which are wound in said other direction and with windings from said A.C. power supply line which are wound in said other direction, and the other $2n$ windings of the D.C. power supply line being wound in said other direction, one of said resonant circuits being coupled to said input circuit and having a resonant frequency $f$ and the other being coupled to said output circuit and having a resonant frequency $F-f$, said output circuit being coupled to at least one of said resonant circuits, said first and second resonant circuits being electrically decoupled from each other and substantially no A.C. power being transmitted therebetween when an A.C. power signal is applied to the circuit, means for applying an A.C. signal of frequency F to said A.C. power supply circuit, and means for applying a D.C. signal to said D.C. power supply circuit, and means for applying a modulated signal input with a carrier frequency $f$ to said first resonant circuit, whereby parametric oscillations are generated in said resonant circuits for producing an amplified output.

7. An amplifier comprising an input circuit, an output circuit, two resonant circuits, each having four windings therein, four non-linear inductances in the shape of four cores, a winding in each resonant circuit wound on each core, all of the windings in the first resonant circuit being wound in one direction, and two of the windings in the second resonant circuit being wound in said one direction and the other two being wound in the other direction, the values of said inductances determining the resonant frequency of said resonant circuits, means for varying said parameters comprising an A.C. power supply means having a frequency F and, a D.C. power supply, the A.C. power supply means having four windings, one on each core, two of the windings being wound in said one direction with one of said last mentioned two windings being on a core with a winding from said second resonant circuit which is wound in said one direction and the other of said last mentioned two windings being on a core with a winding from said second circuit which is wound in the other direction, and the other two windings of the A.C. power supply means being wound in said other direction, and said D.C. power supply having four windings, one on each core, two of the windings being wound in said one direction with one of said last mentioned two windings being on a core with a winding from the second resonant circuit which is wound in the said one direction and with a winding from the A.C. power supply which is wound in the said one direction, and the other of said last mentioned two windings being on a core with a winding from the said second resonant circuit which is wound in the said other direction and with a winding from the A.C. power supply which is wound in the said other direction, and the other two windings of the D.C. power supply being in said other direction, one of said resonant circuits being coupled to said input circuit and having a resonant frequency $f$ and the other being coupled to said output circuit and having a resonant frequency $F-f$, means in at least one of said power supplies for controlling the power supplies for periodically interrupting the oscillations generated in said resonant circuits, means coupled to said input circuit for applying thereto a modulated signal with a carrier frequency $f$, and means coupled with said output circuit for passing the oscillations generated in said output circuit through a band pass filter and demodulating it, whereby the oscillations generated in said resonant circuits are converted to amplified output.

8. An amplifier comprising an input circuit, an output circuit, a plurality of amplifier circuits each comprising two resonant circuits, each having four windings therein, four non-linear inductances in the shape of cores, a winding in each resonant circuit wound on each core, all of the windings in the first resonant circuit being wound in one direction, and two of the windings in the second resonant circuit being wound in said one direction and the other two being wound in the other direction, the values of said industances determining the resonant frequency of said resonant circuits, an A.C. power supply line for supplying an A.C. signal of frequency F and a D.C. power supply line, the A.C. power supply line having four windings, one on each core, two of the windings being wound in said one direction with one of said last mentioned two windings being on a core with a winding from said second resonant circuit which is wound in said one direction and the other of said last mentioned two windings being on a core with a winding from said second circuit which is wound in the other direction, and the other two windings of the A.C. power supply line being wound in said other direction, and said D.C. power supply line having four windings, one on each core, two of the windings being wound in said one direction with one of said last mentioned two windings being on a core with a winding from the second resonant circuit which is wound in the said one direction and with a winding from the A.C. power supply line which is wound in the said one direction, and one of said last mentioned two windings being on a core with a winding from the said second resonant circuit which is wound in the said other direction and with a winding from the A.C. power supply line which is wound in the said other direction, and the other two windings of the D.C. power supply line being wound in said other direction, one of said resonant circuits having a resonant frequency $f$ and the other having a resonant frequency $F-f$, said amplifier circuits being coupled with the resonant circuits of a preceding amplifier circuit and coupled to a succeeding amplifier circuit with the resonant circuit of the preceding amplifier circuit having the frequency $F-f$ being the resonant circuit of the succeeding amplifier circuit having the frequency $F-f$, the resonant circuit having a frequency $f$ of the first of said amplifier circuits being coupled to said input circuit, the resonant circuit having a frequency $F-f$ of the last of said amplifier circuits being coupled to said output circuit, a plurality of A.C. power supply means and D.C. power supply means, one for each $n$th amplifier circuit, where $n$ is a whole number greater than 2, means in each of said power supply means for controlling the power supply means for periodically interrupting the oscillations generated in said resonant circuits with the oscillations in a preceding amplifier circuit being interrupted just after the oscillations in a succeeding circuit are started, means coupled to the input circuit for applying thereto a modulated signal with a carrier frequency $f$, and means coupled with said output circuit for passing the oscillations generated in said one resonant circuit through a band pass filter and demodulating it.

9. An amplifier as claimed in claim 8 in which the windings of said resonant circuits are separate from the remainder of said circuits, and transformer connections between said resonant circuits and the windings therein.

10. An amplifier circuit comprising an input circuit, an output circuit, two resonant circuits, each having four windings in series therein, each winding in each resonant circuit being paired with a winding in the other resonant circuit, and two of the wndings in one circuit being reversed with respect to the other windings in said one circuit, the four pairs of windings forming linear transformers, said other circuit having four non-linear capacitances therein, two coupled across each two windings, a source of A.C. power having a frequency F, and a source of D.C. bias having a negative bias and a positive bias of equal value, said source of A.C. power being coupled to said other resonant circuit between the two capacitors across one of said pairs of windings, and to said other resonant circuit between the two capacitances across the other of said pairs of windings, and the positive bias from said source of D.C. bias being coupled to said other resonant circuit between said two windings paired with the unreversed windings in said one resonant circuit, and the negative bias from said source of D.C. bias being coupled to said other resonant circuit between the two windings paired with the reversed windings in said one resonant circuit, one of said resonant circuits having a resonant frequency $f$ and being coupled with said input circuit and the other being coupled to said output circuit and having a resonant frequency $F-f$, said output circuit being coupled to at least one of said resonant circuits, said first and second resonant circuits being electrically decoupled from each other and substantially no A.C. power being transmitted therebetween when an A.C. power signal is applied to the circuit, means for applying an A.C. signal of frequency F to said A.C. power supply circuit, and means for applying a D.C. signal to said D.C. power supply circuit, and means for applying a modulated signal input with a carrier frequency $f$ to said first resonant circuit, whereby parametric oscillations are generated in said resonant circuits for producing an amplified output.

11. An amplifier comprising an input circuit, an output circuit, a plurality of amplifier circuits each comprising two resonant circuits, each having four windings in series therein, each winding in each resonant circuit being paired with a winding in the other resonant crcuit, and two of the windings in one resonant circuit being reversed with respect to the other windings in said one circuit, and linear cores on which said windings are wound, said other circuit having four non-linear capacitances therein, two coupled across each two windings, an A.C. supply line coupled to said other resonant circuit between the two capacitances across one of said pairs of windings, and having a second A.C. power supply line coupled to said other resonant circuit between the two capacitances across the other of said pairs of windings, a first D.C. power supply line coupled to said other resonant circuit between said two windings paired with the unreversed windings in said one resonant circuit, and a second D.C. power supply line coupled to said other resonant circuit between the two windings paired with the reversed windings in said one resonant circuit, one of said resonant circuits having a resonant frequency $f$ and the other having a resonant frequency $F-f$, said amplifier circuits being coupled to each other with the resonant circuits of a preceding amplifier circuit being coupled to a succeeding amplifier circuit with the resonant circuit of the preceding amplifier circuit having the frequency $F-f$ being the resonant circuit of the succeeding amplifier circuit having the frequency $F-f$, the resonant circuit having a frequency $f$ of the first of said amplifier circuits being coupled to said input circuit, the resonant circuit having a frequency $F-f$ of the last of said amplifier circuits being coupled to said output circuit, an A.C. power supply means coupled to said A.C. power supply lines in each amplifier circuit, a source of negative D.C. bias coupled to said second D.C. power supply lines in each amplifier circuit, a source of positive D.C. bias of a value equal to the negative D.C. bias coupled to said first D.C. power supply lines in each amplifier circuit, control means in said power supplies for controlling said power supplies for periodically interrupting the oscillation generated in said resonant circuits with the oscillations in a preceding amplifier circuit being interrupted just after the oscillations in a succeeding amplifier circuit are started, means coupled to the input circuit for applying thereto a modulated signal with a carrier frequency $f$, and means with the output circuit for passing the oscillations generated in said one resonant circuit through a band pass filter and demodulating it.

No references cited.